UNITED STATES PATENT OFFICE.

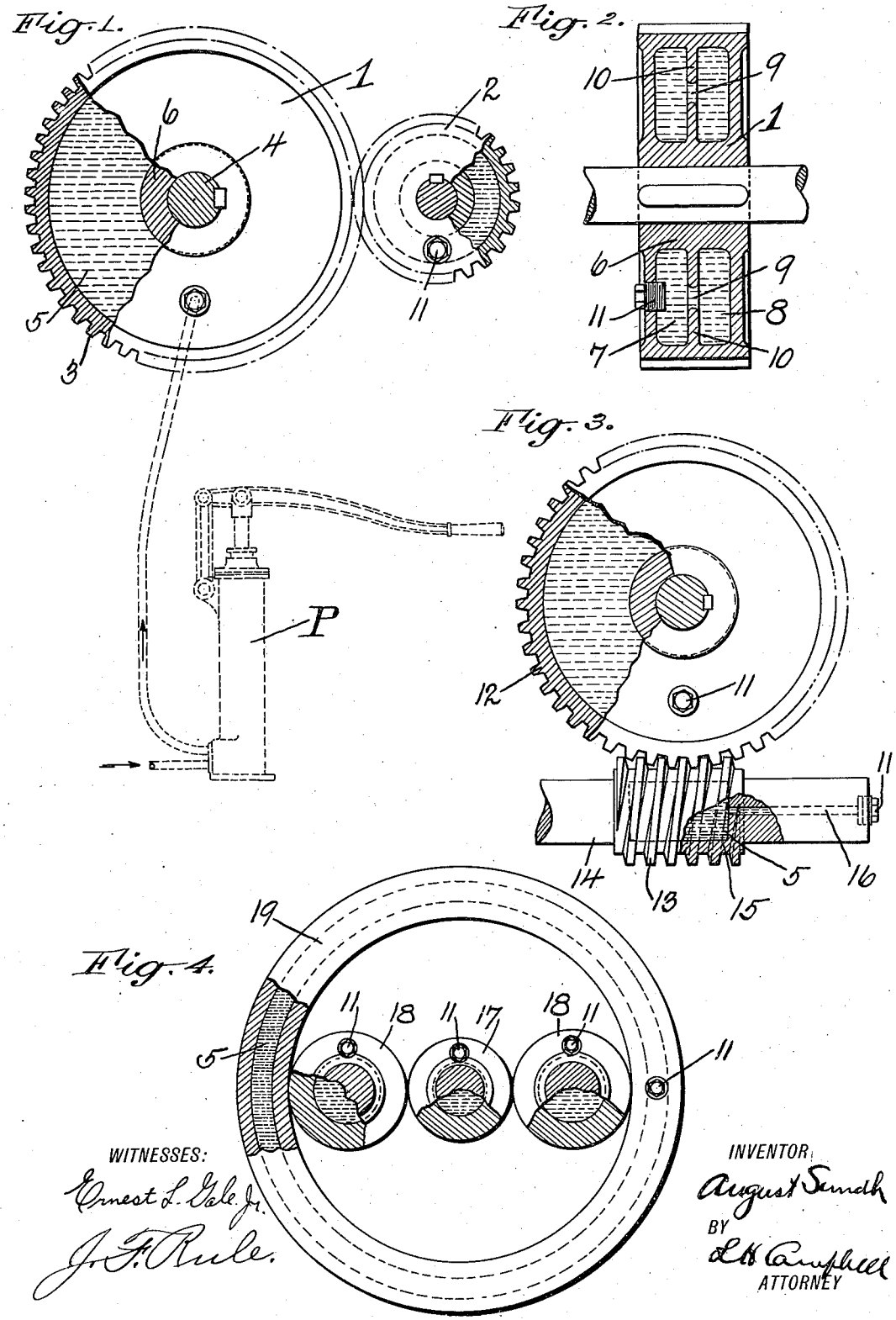

AUGUST SUNDH, OF HASTINGS-UPON-HUDSON, NEW YORK, ASSIGNOR TO OTIS ELEVATOR COMPANY, A CORPORATION OF NEW JERSEY.

NON-RESONANT GEARING.

1,185,953. Specification of Letters Patent. Patented June 6, 1916.

Application filed November 16, 1911. Serial No. 660,627.

*To all whom it may concern:*

Be it known that I, AUGUST SUNDH, a citizen of the United States, residing at Hastings-upon-Hudson, in the county of Westchester and State of New York, have invented a new and useful Improvement in Non-Resonant Gearing, of which the following is a specification.

My invention relates to non-resonant gearing.

The primary object of the invention is to produce gears that are non-resonant or which will not transmit the sound vibrations as do the usual forms of gears. By the use of my invention, the noise of operation of spur gears and other forms of gearing may be greatly reduced or practically eliminated.

Referring to the accompanying drawings which illustrate various forms of gear wheels or power transmitting devices, Figure 1 is a view partly in section of intermeshing spur gear wheels constructed in accordance with my invention, and also showing a means for filling the hollow gear wheels with a suitable liquid; Fig. 2 is a transverse sectional view of a gear wheel; Fig. 3 shows a worm wheel and worm constructed in accordance with my invention; Fig. 4 shows a train of friction gearing.

Referring particularly to Figs. 1 and 2, a spur gear wheel 1 is provided with the usual spur gear teeth 3, and may be keyed to a shaft 4 in the usual way. The gear wheel is made hollow to receive a liquid or mobile substance 5, such as oil, water, vaseline, etc. The chamber containing the liquid 5 preferably completely surrounds the hub 6 of the wheel, and, as shown in Fig. 2, may comprise two or more compartments 7, 8, in communication through openings 9 formed in the wall or partition 10 which separates said compartments. The liquid or filling material is injected through an opening which is normally closed by a plug 11. As shown in Fig. 1 a pump P may be employed to force the liquid into the gear. The liquid or semi-liquid material within the gear is preferably placed under compression. The plug 11 serves not only to prevent the escape of liquid, but as a means of applying and adjustably varying the pressure. As shown in Fig. 2 the plug 11 is somewhat longer than the thickness of the wall of the gear, thereby permitting the plug to be screwed inward sufficiently to place any desired degree of pressure on the inclosed material. The liquid or like substance within the gear acts to absorb or prevent sound vibrations being transmitted through the gear wall, and thereby greatly reduces or practically eliminates the noise which is always present in the operation of the ordinary forms of spur gearing. As shown in Fig. 1 a spur pinion 2 is in mesh with the gear wheel 1. The construction of this pinion is substantially the same as that described in connection with the gear 1.

In Fig. 3 is shown a worm gear wheel 12 which runs in mesh with a worm 13 formed on the worm shaft 14. The internal structure of the wheel 12 is the same as that of the gear wheel already described. The worm shaft is also made hollow or formed with a chamber 15 filled with the liquid 5. A passage 16 extends from the chamber 15 to the end of the shaft and is closed with an adjustable plug 11.

Fig. 4 illustrates a train of friction gears comprising a central friction wheel 17, wheels or rollers 18 in frictional rolling contact therewith, and an annular member 19 surrounding and in frictional rolling contact with the rollers 18. Each of these friction elements is made hollow or formed with a chamber to receive the material 5, and each is provided with a plug 11 for adjusting and maintaining the internal pressure.

It will be understood that the present invention is applicable to other forms of gears or power transmitting elements than those herein shown. Various means other than those herein disclosed might also be employed for maintaining pressure on the liquid or filling material. Various other modifications and changes in the details of construction and arrangements of parts might also be employed without departing from the spirit and scope of my invention. I wish therefore not to be limited to the particular constructions herein shown.

What I claim as new and desire to secure by Letters Patent of the United States is:

1. In combination, a power transmitting element formed with an internal space of fixed volume, a mobile substance filling said space, and means for maintaining pressure on said substance.

2. In combination, a power transmitting element formed with an interior space, a liquid filling said space, and means for maintaining an adjustable pressure on the liquid.

3. In combination, a power transmitting element having an interior chamber of constant volume and formed with an opening leading to said chamber, a liquid under compression within the chamber, and a closure for said opening adjustable to vary the pressure on said liquid.

4. The combination of a hollow power transmitting element formed with an intake opening, a filling liquid under compression within said element, and a plug adjustable in said opening.

5. As an article of manufacture, a gear wheel comprising an outer shell forming a chamber of fixed volume, a filling of non-resonant material under pressure, and means to adjust said pressure.

In testimony whereof, I have signed my name to this specification in the presence of two subscribing witnesses.

AUGUST SUNDH.

Witnesses:
JAMES G. BETHELL,
J. F. RULE.